United States Patent [19]

Eusebi et al.

[11] Patent Number: 5,609,367
[45] Date of Patent: Mar. 11, 1997

[54] ADJUSTABLE THREE-POINT RESTRAINT SEAT BELT SYSTEM FOR CHILDREN AND ADULTS

[75] Inventors: Christopher Eusebi, White Lake; Raymond Vivacqua, Northville, both of Mich.

[73] Assignee: AlliedSignal Inc., Morristown, N.J.

[21] Appl. No.: 565,767

[22] Filed: Dec. 1, 1995

[51] Int. Cl.⁶ .................................................. B60R 22/16
[52] U.S. Cl. ...................... 280/808; 280/801.2; 280/804; 297/486; 297/468
[58] Field of Search .............................. 280/801.2, 808, 280/804, 801.1; 297/483, 486, 468, 473

[56] References Cited

U.S. PATENT DOCUMENTS

| | | | |
|---|---|---|---|
| 3,686,048 | 7/1972 | Weman | 297/285 X |
| 4,796,919 | 1/1989 | Linden | 250/808 |
| 4,799,737 | 1/1989 | Greene | 297/468 |
| 4,832,366 | 5/1989 | Corbett et al. | 280/808 |
| 4,846,498 | 7/1989 | Föhl | 280/801.2 |
| 5,169,174 | 12/1992 | Gray | 280/801.2 |
| 5,201,099 | 4/1993 | Campbell | 280/808 X |
| 5,306,045 | 4/1994 | Parks | 280/808 |
| 5,476,287 | 12/1995 | Lichtwardt | 280/801.2 |

*Primary Examiner*—Christopher P. Ellis
*Attorney, Agent, or Firm*—Markell Seitzman

[57] ABSTRACT

A seat belt restraint system for use by a child and an adult comprising: a three-point seat belt restraint system (20) having an additional web guide (50) to lower one of the restraint points to permit a shoulder belt to extend across the upper torso of a child.

11 Claims, 3 Drawing Sheets

ADJUSTABLE THREE-POINT RESTRAINT SEAT BELT SYSTEM FOR CHILDREN AND ADULTS

BACKGROUND AND SUMMARY OF THE INVENTION

The present invention generally relates to safety belt systems and more particularly to a three-point system that is specifically designed for use with both an adult and a child.

Safety seats or booster seats are available for infants and small children, the larger sized child will sit in a passenger seat. Occasionally an adult may permit the child to sit in a front seat; in this situation some children have placed the shoulder belt behind their back. Obviously, the latter position diminishes any benefit that could be derived from the shoulder belt. In cars equipped with an air bag the child who is not restrained or who is improperly restrained is a potential an out-of-position occupant. The proposed system can improve the performance of a restraint system by reducing the likelihood of a seated child being out of position during air bag deployment.

An object of the present invention is to provide an improved child restraint system.

Accordingly the invention comprises: an improved three-point seat belt restraint system wherein one of the restraint points is a first web guide which defines the angle at which the seat belt crosses the upper torso of a seated occupant and through which a seat belt is received, the improvement comprising first means for lowering the restraint point to permit a belt to cross the upper torso of a seated child at a determined angle. In one embodiment of the invention the first means includes a second web guide for selectively receiving the seat belt and for adjusting the departure angle from the restraint point across the seated child wherein this second web guide comprises an open loop therein to receive a shoulder belt portion of the seat belt. This open loop can be attached to the vehicle's B-pillar or to the seat. In another embodiment a height adjuster is provided wherein the length of a track extends from a height above the shoulder height of an identifiable seated adult to a height below the height of an identifiable seated child.

Many other objects and purposes of the invention will be clear from the following detailed description of the drawings.

DETAILED DESCRIPTION OF THE DRAWINGS

Figure 1:
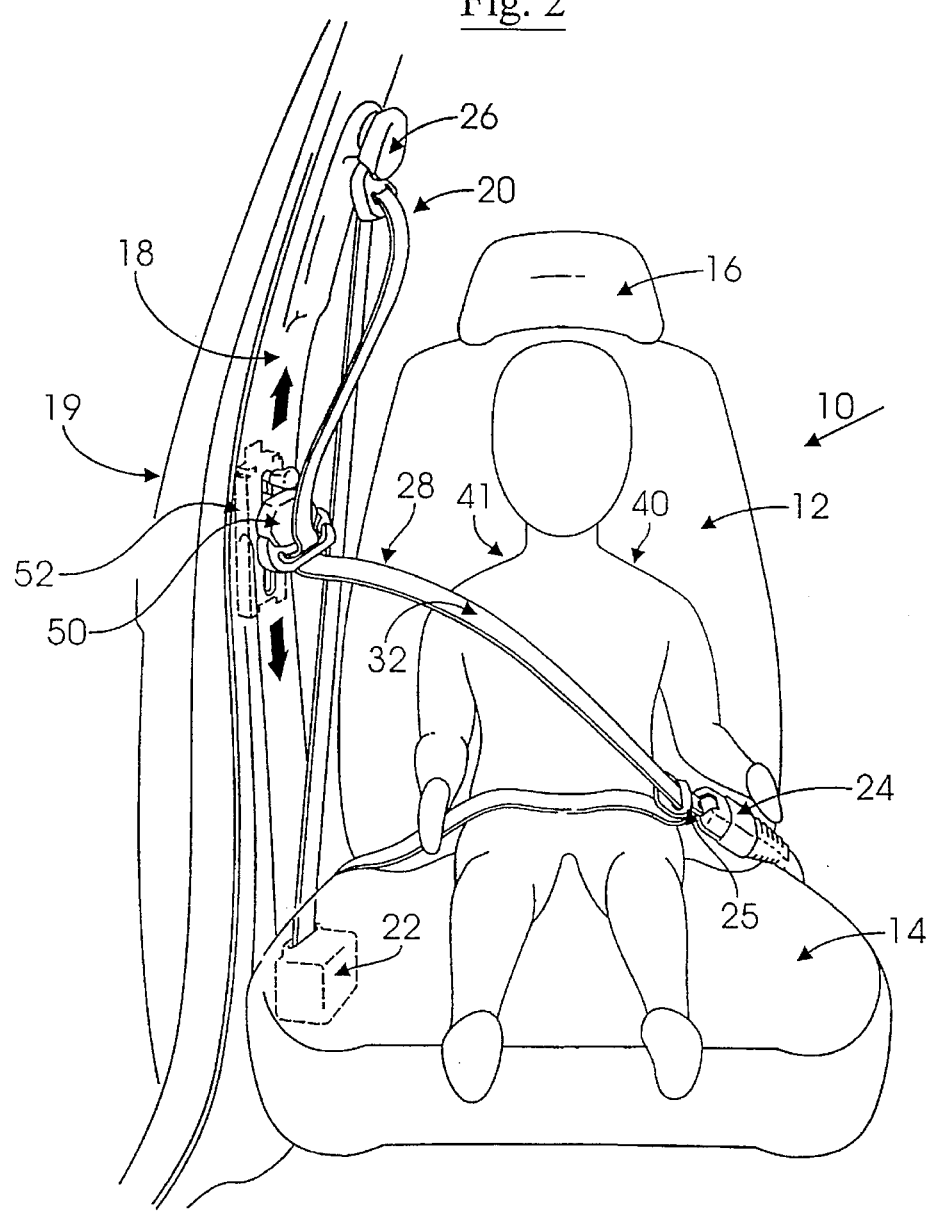
FIG. 1 illustrates a three-point child restraint system.

Reference is made to FIG. 1 which illustrates a conventional automotive seat 10 having a back portion 12 and a seat cushion 14 and headrest 16. The seat 10 is positioned adjacent a pillar such as the B-pillar 18 of the vehicle. The B-pillar is adjacent a vehicle door 19. Also shown in FIG. 1 is a conventional three-point restraint system which, as seen below, is modified by the present invention.

Figure 2:
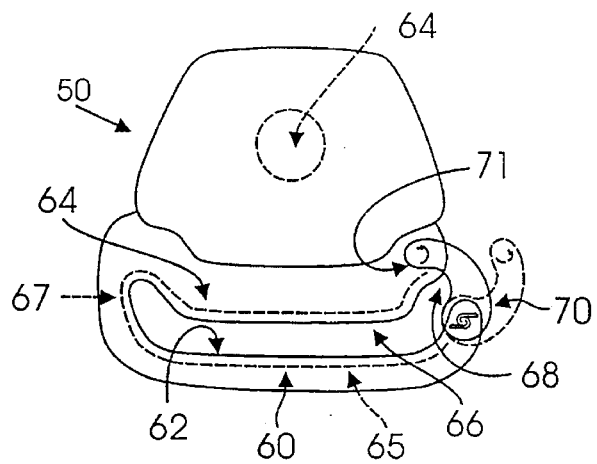
FIG. 2 illustrates a plan view of one component of the system.

A typical three-point seat system 20 comprises at least one retractor 22, a seat belt buckle 24 secured to the seat 10 or floor of the vehicle and engaged by a tongue 25 and a web guide or D-ring 26 secured to the B-pillar as shown in FIG. 1 or to the seat as part of an integrated seat/seat belt system. As can be seen, the retractor, buckle and web guide comprise the first, second and third restraint points of this three-point system 20. The three-point system 20 also comprises a length of seat belt webbing generally shown as 28 which is separated into a lap belt 30 and a shoulder belt 32 in a known manner. As can be appreciated, the shoulder belt portion 32 of the three-point restraint 20 which normally extends from the web guide 26 to the buckle 24 would typically extend across the seated child 40 at a point other than his or her shoulder. This deficiency is corrected by the present invention. In the present invention a second web guide 50 is mounted either directly on the B-pillar 18 or, alternatively, adjustably mounted on a vertically movable height adjuster 52 of known construction. In the present invention the second web guide 50 comprises an open loop generally in the form of a "C" as shown in FIG. 2. This web guide 50 is of a similar construction to web guide 26 and comprises a load absorbing core 60 which may be covered by a metallic or plastic coating to reduce sliding friction between the seat belt and a belt support surface 62. The web guide 50 and its corresponding support structure should be able to withstand a load in the range of 8220 N (1850 lb.) to 16449 N (3700 lb.). This web guide 50 includes a fastener, generally shown as 64, which is secured into the B-pillar 18 or into the height adjuster 50. A cover unnumbered can be used to cover the fastener as is known in the art. As is also known in the art the web guide 50 and web guide 26 are rotatably mounted relative to the support via the fastener. The core 60 of the web guide 50, shown in FIG. 2, additionally includes upper, lower and side support members 64, 65 and 67 respectively. As can be seen, the upper support member and lower support member form an open slot 66 through which the shoulder belt portion 32 of the seat belt 28 is received through an open end 68. With the second web guide installed on or relative to the B-pillar the opening 68 in the web guide 50 is rearward facing. FIG. 2 also illustrates an alternate embodiment of the invention in which a rotatable lever 70 is biased inwardly by a spring 72 to the position shown in solid line which captures the shoulder belt 32 within the slot 66. In addition to closing the opening or open end 68, the lever 70 can matingly engage a section 71 of the upper support 64 to transfer a portion of the load from the lower support 65 to the upper support 64.

In operation, when a child is seated on seat 10 with the tongue 25 inserted within buckle 24 the child or adult moves the shoulder belt portion 32 away from his or her body and places the shoulder belt 32 within the slot 66 of the second web guide 50, thereby repositioning the should belt such that it will lie across the shoulder 41 of the child 40. Additional vertical adjustment may be obtained if the second web guide 50 is connected to a vertically adjustable height adjuster 52. It should be appreciated that a portion of the seat belt extending from the retractor 22 to the first web guide 26 is shown exposed in FIG. 1. This portion of the seat belt may also be installed within the typically hollow B-pillar or hidden by plastic fascia.

Figure 3:
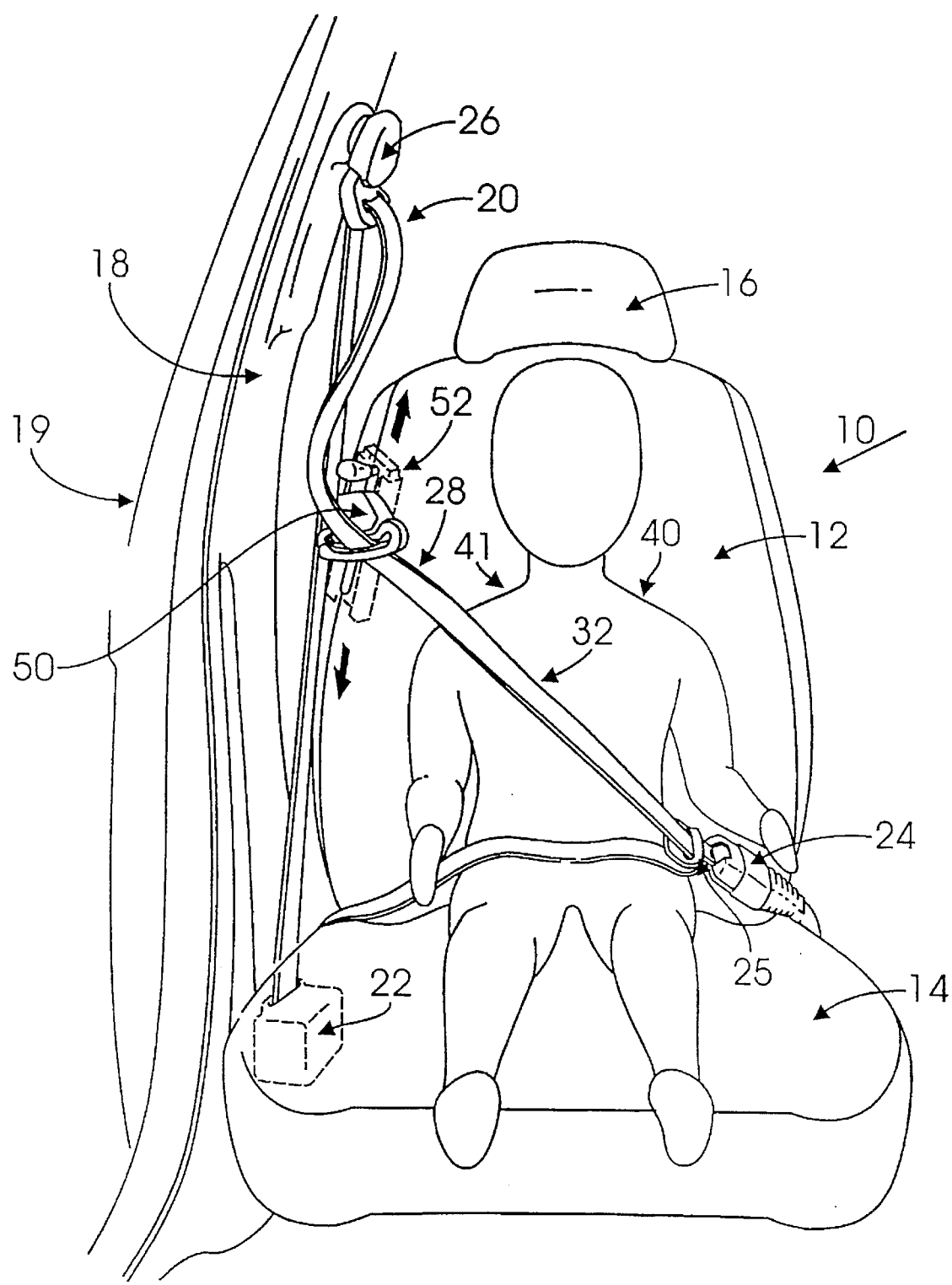
FIG. 3 illustrates an alternate embodiment of the present invention.

Reference is briefly made to FIG. 3 which illustrates an alternate embodiment of the present invention. In this embodiment an alternate multi-point restraint system is shown in which the second web guide 50' is connected directly to a structural support member of the seat 10 or connected to the seat via a height adjuster 52. As can be seen the web guide 50 readjusts the shoulder belt portion 32 of the webbing 28 such that it properly lies across the upper torso of the child. Further the web guide 50' of FIG. 3 is of similar construction to that shown in FIG. 2, the modification being that the opening 68 for the slot 66 is provided on the left side of the web guide such that, as before, the opening 68 faces the rear of the vehicle.

Figure 4:
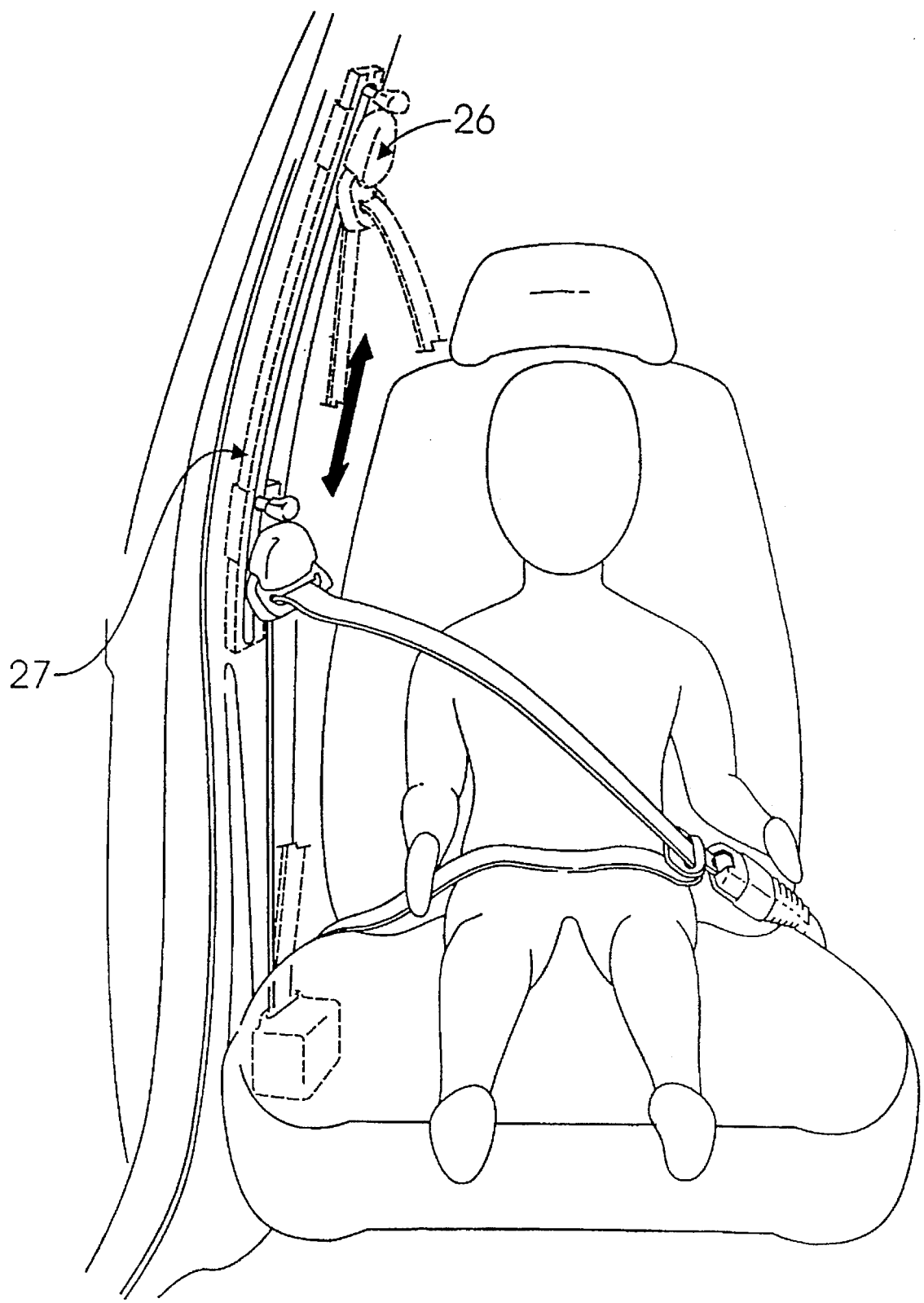
FIG. 4 shows a further embodiment of the invention.

FIG. 4 illustrates another embodiment of the invention in which the web guide (26) is mounted to a height adjuster (27). While not discussed in any detail below, height adjusters typically comprise a track (100) having a plurality of securement points therealong such that the web guide (26) can be adjustably relocated to any one of the securement points. Another type of height adjuster is the motorized height adjuster in which the web guide (26) moves with a moveable channel or track through a defined range of motion. While it is known to provide a height adjuster within the B-pillar (18) of the vehicle or alternatively, to incorporate a height adjuster within the seat back (12) no height adjuster has been proposed in which the range of motion is sufficient to be able to reposition the web guide and hence the shoulder belt portion across the shoulder or upper body of the occupant when the occupant is either an adult or a child. As can be seen from FIG. 4, the height adjuster extends sufficiently downward along the B-pillar from a height above that of a typically sized adult to below the shoulder of a typically sized child permitting the web guide to be optimally positioned for any sized occupant.

Many changes and modifications in the above described embodiment of the invention can, of course, be carried out without departing from the scope thereof. Accordingly, that scope is intended to be limited only by the scope of the appended claims.

We claim:

1. In a seat belt restraint system comprising: a three-point seat belt restraint system (20) wherein one of the restraint points is a first web guide (26) which defines the angle at which the seat belt crosses the upper torso of a seated occupant, first means for lowering the restraint point to permit a belt to cross the upper torso of a smaller occupant child at a determined angle, and wherein the first means comprises a second web guide means (50) which selectively receives the seat belt (28) and adjusts the departure angle from the restraint point across the seated smaller occupant, said second web guide means being attached to a height adjusting means (52) for vertically adjusting the position of said second web guide means, wherein the second web guide means comprises a rotatably mounted, load absorbing loop having an opening or open end (68) therein to receive a shoulder belt portion (32) of the seat belt.

2. The system as defined in claim 1 wherein the opening within the second web guide faces rearward.

3. The system as defined in claim 1 wherein a closing means comprising a spring loaded lever, is mounted near the opening (68) in the second web guide for selectively closing the opening.

4. The system as defined in claim 3 wherein the closing means is a load bearing member.

5. In a seat belt restraint system comprising: a three-point seat belt restraint system (20) wherein one of the restraint points is a first web guide (26) which defines the angle at which the seat belt crosses the upper torso of a seated occupant, first means for lowering the restraint point to permit a belt to cross the upper torso of a seated smaller occupant at a determined angle, wherein the first means includes second web guide means and wherein the second web guide means is attached to a height adjuster means (52) for vertically adjusting the position of the second web guide.

6. A seat belt restraint system for use by an adult or smaller occupant such as a child comprising a seat belt (28) configured to form a shoulder belt portion (32) and a lap belt portion (30) about the seated adult, the shoulder belt portion (32) extendible from a first web guide (26) when protecting an adult and moveable by a second web guide (50) to adjust the angle that the shoulder belt portion makes as it crosses the torso of the seated smaller occupant, wherein the second web guide is attached to a height adjuster means (52) for vertically adjusting the position of said second web guide means, said height adjusting means being attached to a structural member of a seat (10).

7. The system as defined in claim 6 wherein the second web guide comprises a loop having an opening or open end (68) therein to receive the shoulder belt portion (32).

8. The system as defined in claim 7 wherein the opening within the second web guide faces rearward.

9. The system as defined in claim 8 wherein a closing means is mounted near the opening (68) in the second web guide for selectively closing the opening.

10. The system as defined in claim 9 wherein the closing means includes a spring biased rotatable lever (70).

11. The system as defined in claim 10 wherein the closing means is a load bearing member.

* * * * *